United States Patent [19]

Kytta

[11] Patent Number: 4,574,455
[45] Date of Patent: Mar. 11, 1986

[54] METHOD OF MANUFACTURING A SHELL WITH AN INTEGRAL REINFORCING PLATE

[75] Inventor: Oswald O. Kytta, South Bend, Ind.

[73] Assignee: Allied Corporation, Morristown, N.J.

[21] Appl. No.: 647,293

[22] Filed: Sep. 4, 1984

[51] Int. Cl.⁴ ............................................. B23P 9/00
[52] U.S. Cl. ..................................... 29/445; 29/523; 29/525; 29/283.5; 60/553
[58] Field of Search .............. 29/505, 464, 525, 283.5, 29/445, 523; 72/379, 391; 60/553; 92/169.2

[56] References Cited

U.S. PATENT DOCUMENTS

| | | | |
|---|---|---|---|
| 1,294,486 | 2/1919 | Kuen | 29/445 |
| 2,239,368 | 4/1941 | Lyon | 29/505 |
| 2,990,917 | 7/1961 | Stelzer | 29/445 X |
| 3,041,717 | 7/1962 | Brown | 29/505 X |
| 3,050,844 | 8/1962 | Wagner | 29/445 UX |
| 3,137,361 | 6/1964 | Randal | 92/169.2 X |
| 3,293,849 | 12/1966 | Smith | 60/553 |
| 3,570,093 | 3/1971 | Gallwitzer | 29/523 X |
| 4,407,184 | 10/1983 | Ando et al. | 92/169.2 X |
| 4,445,263 | 5/1984 | Carre et al. | 29/445 |

*Primary Examiner*—Charlie T. Moon
*Attorney, Agent, or Firm*—Leo H. McCormick, Jr.; Ken C. Decker

[57] ABSTRACT

A method of manufacturing a shell (10) for a vacuum brake booster wherein a reinforcing plate (22) is coined to the shape of the end member (16) to provide structural strength for uniformly transmitting forces from a reaction member to the body (16) of the shell. After the reinforcing plate (22) is coined, holes (36, 38) are simultaneously punched through the plate (22) and end member (16) for fastener (40, 42) means through which the brake booster is attached to the reaction member.

8 Claims, 7 Drawing Figures

METHOD OF MANUFACTURING A SHELL WITH AN INTEGRAL REINFORCING PLATE

This invention relates to a method of making a shell for a vacuum brake booster from a thin sheet of metal and coining a reinforcing plate to the end section thereof to uniformly distribute reactionary forces to the body of the booster.

With a reduction in the thickness of the shells which make up vacuum brake boosters, it has been suggested to locate a reinforcing plate located adjacent the end of a shell to aid in transferring reaction forces from a master cylinder to a stationary support member. In such a booster it is common practice to make the shells be of a first-size or gauge material and the reinforcing plate of the same or different gauge material depending on the force that a booster can be expected to produce. When the booster and reinforcing plate have been made separately, at times when the reinforcing plate was inserted into the shell either the holes for the attachment did not match or the shape of the reinforcing plate did not match the end member. In situations where the holes did not match and were redrilled and the shape of the reinforcing plate was different than the end member, non-uniform stresses may be introduced in the booster housing by this extra step in the manufacture. After a period of time such non-uniform stresses could cause the material in the booster to fail by cracking and produce a non-seal condition for the booster.

In an effort to match a reinforcing plate with a booster shell it was suggested in U.S. Pat. No. 4,445,263 that the shell could be preformed by applying a force to the reinforcing plate. In this method, the booster shell is retained by its peripheral surface and the force applied to the reinforcing member to provide a permanent elongation for the web of the shell. While the material used to manufacture such shells is all designated to a certain specification, the thickness between shipments can vary within set limits. As a result even though the end members and reinforcing plate are substantially matched, non-uniform stress may still occur in the web section of the shell.

The method of manufacturing a shell for a vacuum brake booster as disclosed in the present invention has a separate stamping operation for the shell and reinforcing plate but a final stamping step when a reinforcing plate is coined to the end member of the booster. The shell which has a conical body that transitions into a rectangular end section is held in a stationary die. Thus, the shell can be manufactured to a set specification and is not distorted by a later step of attaching the reinforcing plate thereto. In a separate step, the reinforcing plate is stamped to create a rectangular plate member. The rectangular plate member is struck with a die to establish a central opening and create a peripheral flange. The peripheral flange extends from a base at about a 45° angle. When the reinforcing plate is inserted in the conical body, the flanges on the side of the plate aid in centering the opening in the plate with a corresponding opening in the end member. A guide on a die extends through the openings in the reinforcing plate and end member while a force is applied to the reinforcing plate. Since the shell is held stationary only the reinforcing plate is reshaped to conform to the shape of the shell. The reinforcing plate is struck with a sufficient number of blows to coin the plate into the shape of the end member. The reinforcing plate extends a distance along the web to further reinforce the conical member. As the reinforcing member is struck, holes are punched into both the end member and reinforcing plate to assure alignment for fastening bolts. Later when the fastening means are connected to the shell a sufficient bond has been established to uniformly transfer stresses to the web of the conical body. The size of the opening in the plate is selected such that a groove is produced between the end member and plate. This groove is designed to retain a bearing member to provide a seal for a resulting brake booster.

An advantage of this method of manufacture occurs through the shaping of the reinforcing plate to match the shape of the rectangular end member while simultaneously punching holes for the fastener to thereby assure that the fastener, plate and end member are aligned.

Another advantage of this method of manufacturing a shell occurs through the simultaneous coining of the reinforcing plate to the shape of the end member and a portion of a web that extends from a conical body thereof while holes for bolts that attach the shell to another member are punched in the plate and end member to assure that proper alignment is produced.

It is an object of this invention to provide a thin shell with a reinforcing plate through which stresses are uniformly transferred into a conical portion of the shell body.

These advantages and objects should be apparent from reading this specification while viewing the drawing.

The invention will now be described with reference to the accompanying drawings wherein.

Figure 1:
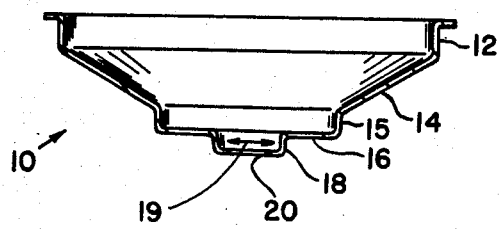
FIG. 1 is a sectional view of a thin shell for use in a vacuum brake booster.
Figure 2:
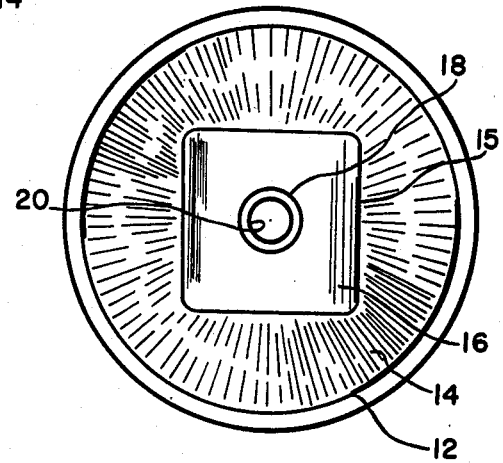
FIG. 2 is an end view of the shell of FIG. 1.

The shell 10 shown in FIG. 1 is formed from a single sheet of thin metal such as steel or aluminum. In this stage of shaping the shell 10, a cylindrical body 12 has a conical section 14 that transitions into a rectangular cup-shaped end section defined by tubular portion 15 and end member 16. An annular projection 18 that extends from the rectangular end member 16 has an opening 20 through which a push rod of a vacuum booster extends. As best seen in FIG. 2, the end member 16 is at this stage free from any holes for mounting bolts.

Figure 3:
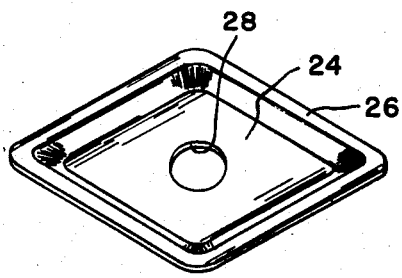
FIG. 3 is a prospective view of a reinforcing plate for use with the thin shell of FIG. 1.

In a secondary stamping step a reinforcing plate 22 as shown in FIG. 3 is formed with a rectangular base 24 with a dimension substantially identical to rectangular end member 16 and a peripheral flange 26 extends at an angle of about 45° from the base 24. At this same time the flange 26 is formed, an opening 28 is made in the center of the rectangular base 24. (As will be explained later, the diameter of opening 28 is less than the inside diameter 19 of projection 18 but larger than the diameter of opening 20.)

Figure 4:
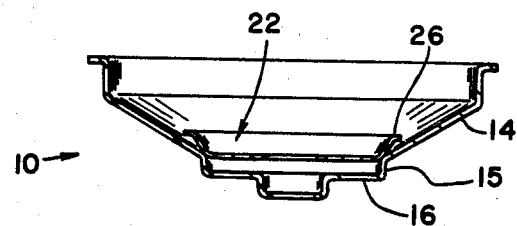
FIG. 4 is a sectional view of the thin shell of FIG. 1 with the reinforcing plate of FIG. 3 located adjacent the end section thereof.
Figure 5:
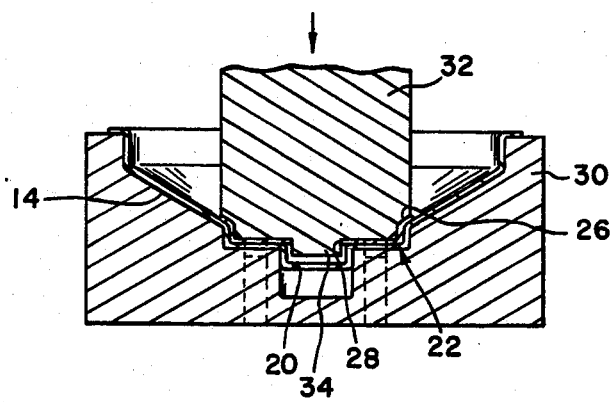
FIG. 5 is a sectional view showing the thin shell located in a fixture with a die of a press aligned with the reinforcing plate.
Figure 6:
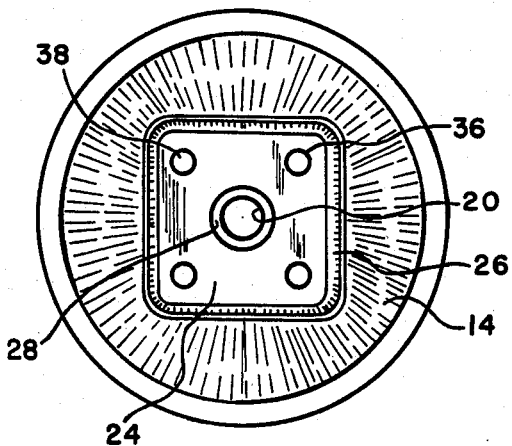
FIG. 6 is an end view of the interior of the shell after the reinforcing plate has been coined thereto.

In the manufacturing of a brake booster a reinforcing plate 22 is placed in the interior of shell 10. Because of the conical shape 14 of the interior of shell 10 and the angle of flange 26, the reinforcing plate 22 is positioned adjacent end plate 16 in a manner as shown in FIG. 4. The shell 10 with the reinforcing plate 22 is then conveyed to a press station and located in a fixture 30 as shown in FIG. 5. The fixture 30 completely supports shell 10. A die 32 that has a shape corresponding to the interior of shell 10 is attached to a press member. While it may not be necessary, die 32 has an annular projection 34 that passes through opening 28 in the reinforcing plate 22 to further align opening 28 with opening 20. The reinforcing plate 22 is struck with a series of blows by die 32 to coin the flange 26 into a shape that is substantially identical to the rectangular cap or end member 16 (see FIG. 7), the transitional area 15 between the conical section 14, and a small portion of the conical section 14. At the same time reinforcing plate 16 coined, openings 36 and 38 see FIG. 6 (more if needed) are provided into both the reinforcing plate 22 and end member 16. As the reinforcing plate 22 is coined into the shape of the end member 16 and conical section 14, a mechanical or frictional bond is created therebetween.

Figure 7:
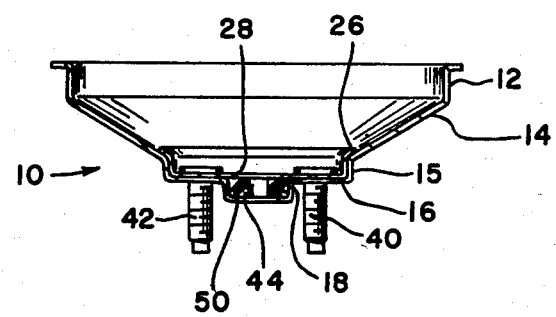
FIG. 7 is a sectional view showing the relationship of the reinforcing plate with the shell with the mounting studs attached thereto.

The shell 10 is now removed from fixture 32 and transfered to a final station where fastener means 40 and 42 are placed in holes 36 and 38, see FIG. 7. Since holes 36 and 38 are simultaneously punched into both the reinforcing plate 22 and end member 16 proper alignment is assured. On insertion of fastener means 40 and 42 (bolts) into holes 36 and 38 a staking operation, welding or gluing fixes the fastener means to the shell 10 while also providing an air tight seal.

When shell 10 passes from the station where the fastener means 40 and 42 are attached to the end member 10, the shell is moved to a station where a seal member 44 is inserted into the projection 18. Because of the difference in diameter of opening 28 and the interior diameter 19 of projection 18, a groove 50 is formed on the shell 10. The seal member 44 is retained in the groove. The size of the reinforcing plate 10 can be varied but as long as the flange 26 extends into the conical section 14 sufficient rigidity should be obtained to adequately transfer stresses created during operation of a resulting brake booster without cracking or introducing a seal failure.

I claim:

1. A method of manufacturing a shell for a housing of a vacuum brake booster comprising the steps of:
    shaping a piece of relatively thin metal material into a member with substantially conical body having a rectangular cup-shaped end section and a transitional surface between said rectangular end section and said conical body;
    placing a central opening in said rectangular end section;
    placing a rectangular plate having a peripheral flange in said conical body, said conical body allowing said rectangular plate to be aligned with said end section; and
    striking said rectangular plate with a force while supporting said cup-shaped end section to force said plate into frictional engagement with said cup-shaped end section and to form said flange into a shape substantially identical with the transitional surface between said rectangular end and conical body, said shaped flange and end section uniformly distributing any reaction forces produced in the resulting brake booster into said conical body.

2. The method as recited in claim 1 wherein said step of striking includes:
    simultaneously punching a plurality of holes through said plate and said end section to provide openings for fastener means through which said brake booster is attached to another member.

3. The method as recited in claim 2 wherein said striking step creates an interference fit between said flange and said transitional surface.

4. The method as recited in claim 3 wherein said step of shaping of said end plate includes the formation of an annular projection having a substantially fixed diameter.

5. The method as recited in claim 4 wherein prior to the step of placing said rectangular plate in said conical body a central hole is punched into said rectangular plate, said central hole having a diameter less than said fixed diameter in said annular projection, said end plate and annular projection forming a groove for retaining a bearing and seal member of said vacuum brake booster.

6. The method as recited in claim 1 wherein prior to placing said rectangular plate in said conical body, a central hole is placed in the rectangular plate and said step of striking said rectangular plate establishes a coined bond between said plate and end section.

7. The method as recited in claim 6 wherein said step of striking includes a step as simultaneously punching a series of holes in said plate and end section to assure that fastening means are properly aligned to uniformly transfer operational stresses between the conical body and another member.

8. The method as recited in claim 7 wherein said striking includes the step of positioning the rectangular plate with respect to said end section to define a stop for a bearing member located in said central opening of the end section.

* * * * *